US008566746B2

(12) United States Patent (10) Patent No.: US 8,566,746 B2
Chuat et al. (45) Date of Patent: Oct. 22, 2013

(54) PARAMETERIZATION OF A CATEGORIZER FOR ADJUSTING IMAGE CATEGORIZATION AND RETRIEVAL

(75) Inventors: Mathieu Chuat, Meylan (FR); Vincent Devin, Seyssinet (FR)

(73) Assignee: Xerox Corporation, Norwalk, CT (US)

( * ) Notice: Subject to any disclaimer, the term of this patent is extended or adjusted under 35 U.S.C. 154(b) by 471 days.

(21) Appl. No.: 12/870,983

(22) Filed: Aug. 30, 2010

(65) Prior Publication Data

US 2012/0054658 A1 Mar. 1, 2012

(51) Int. Cl.
*G06F 3/00* (2006.01)
(52) U.S. Cl.
USPC .......................................................... 715/833
(58) Field of Classification Search
USPC .......................................................... 715/833
See application file for complete search history.

(56) References Cited

U.S. PATENT DOCUMENTS

| | | | |
|---|---|---|---|
| 6,774,917 B1 * | 8/2004 | Foote et al. .................... | 715/700 |
| 7,680,341 B2 | 3/2010 | Perronnin | |
| 7,756,341 B2 | 7/2010 | Perronnin | |
| 7,814,115 B2 * | 10/2010 | White et al. ................... | 707/765 |
| 8,001,152 B1 * | 8/2011 | Solan ............................ | 707/791 |
| 8,332,075 B2 * | 12/2012 | Harrod et al. ................. | 700/278 |
| 2003/0174859 A1 * | 9/2003 | Kim ............................... | 382/100 |
| 2005/0013479 A1 * | 1/2005 | Xiao et al. ..................... | 382/159 |
| 2006/0248054 A1 * | 11/2006 | Kirshenbaum et al. ........ | 707/3 |
| 2007/0078828 A1 * | 4/2007 | Parikh et al. .................. | 707/3 |
| 2007/0258648 A1 | 11/2007 | Perronnin | |
| 2007/0266020 A1 * | 11/2007 | Case et al. ..................... | 707/5 |
| 2007/0283393 A1 * | 12/2007 | Kikinis .......................... | 725/53 |
| 2008/0069456 A1 | 3/2008 | Perronnin | |
| 2008/0104101 A1 * | 5/2008 | Kirshenbaum et al. ....... | 707/102 |
| 2009/0070693 A1 * | 3/2009 | Mosquera et al. ............. | 715/764 |
| 2009/0144033 A1 | 6/2009 | Liu et al. | |
| 2009/0293019 A1 * | 11/2009 | Raffel et al. .................. | 715/833 |
| 2010/0092084 A1 | 4/2010 | Perronnin et al. | |
| 2010/0098343 A1 | 4/2010 | Perronnin et al. | |
| 2010/0318477 A1 | 12/2010 | Perronnin et al. | |
| 2010/0325583 A1 * | 12/2010 | Aarni et al. ................... | 715/833 |
| 2010/0332466 A1 * | 12/2010 | White et al. .................. | 707/722 |
| 2011/0040711 A1 | 2/2011 | Perronnin et al. | |
| 2011/0161329 A1 * | 6/2011 | Winkler ........................ | 707/748 |

(Continued)

OTHER PUBLICATIONS

Csurka, et al. "Visual Categorization with Bags of Key-points," in *ECCV Workshop on Statistical Learning for Computer Vision* (2004).

(Continued)

*Primary Examiner* — Ryan Pitaro
(74) *Attorney, Agent, or Firm* — Fay Sharpe LLP

(57) ABSTRACT

A system and method for digital object categorization or retrieval are provided. The method includes providing for a selector to be graphically presented to a user. The selector is variably adjustable within a range, by the user, to adjust a level of noise in at least one of digital object categorization and digital object retrieval. The range of the selector is normalized over a set of digital object categories based on scores output by a trained categorizer for each of a set of labeled test objects for each of the set of digital object categories and a label for each of the test objects. Selector position information is received by the system and at least one of digital object categorization and digital object retrieval is performed, based on the selector position information. One or more of the method steps may be performed with a computer processor.

25 Claims, 10 Drawing Sheets

(56) References Cited

U.S. PATENT DOCUMENTS

| | | | |
|---|---|---|---|
| 2011/0173078 A1* | 7/2011 | Hicks | 705/14.66 |
| 2011/0293188 A1* | 12/2011 | Zhang et al. | 382/190 |
| 2011/0314049 A1 | 12/2011 | Poirier et al. | |
| 2012/0041672 A1* | 2/2012 | Curtis et al. | 701/426 |
| 2012/0084328 A1* | 4/2012 | Ishikawa et al. | 707/805 |

OTHER PUBLICATIONS

Jegou, et al. "Improving Bag-Of-Features for Large Scale Image Search," in IJCV, 2010.

Perronnin, et al. "Adapted Vocabularies for Generic Visual Categorization," ECCV (4), pp. 464-475 (2006).

Perronnin. "Fisher Kernels on Visual Vocabularies for Image Categorization," IEEE CVPR, (2007).

Csurka, et al. "Incorporating Geometry Information with Weak Classifiers for Improved Generic Visual Categorization," ICIAP pp. 612-620 (2005).

Quelhas, et al. "Modeling Scenes with Local Descriptors and Latent Aspects," in ICCV (2005).

Carbonetto et al., "A Statistical Model for General Contextual Object Recognition," in ECCV (2004).

\* cited by examiner

PARAMETERIZATION OF A CATEGORIZER FOR ADJUSTING IMAGE CATEGORIZATION AND RETRIEVAL

BACKGROUND

The exemplary embodiment relates to the information processing arts, information storage arts, classification arts, and related arts. It finds particular application in connection with the categorization of images using variable test-based measures, and will be described with particular reference thereto.

Digital objects, such as images, speech segments, text documents, and the like are commonly represented as digital files or digital representations, for example as bitmaps or grayscale or color pixel maps in the case of images, audio files in the case of speech segments, text or word processing files in the case of text documents, or hybrid files containing text and images. In the processing and/or storage of such objects, it is useful to categorize (classify according to categories) the objects automatically, with respect to one or more classes or categories. For example, pictorial images can be classified by subject matter, e.g., images of cats, images of dogs, images of vehicles, images of people, and the like.

To facilitate classification, a signature of the object is generated, which may be in the form of a vector having a relatively high dimensionality, i.e., which is sufficient to provide a unique signature for each object, but which incorporates substantially less data than the original object. Thus, for example, an image containing millions of pixels may be represented by a vector having perhaps 128-10,000 dimensions. For images, a suitable vector can be generated by computing features of selected image patches or sampling regions distributed across the image, and employing the computed features as elements of the feature vector or as inputs to a model which assigns a vector based thereon. For images, a Fisher vector or "bag-of-visual-words" vector representation can be used as a suitable vector representation. In the case of text documents, a "bag-of-words" vector representation is sometimes used, in which each vector element corresponds to a word and has a value indicative of a count of occurrences of that word in the text document.

The categorizer receives the vector representation of the object and outputs a classification based on the vector representation. Where there are multiple categories, this can be considered as a series of two class decision problems where each class is evaluated against the rest with a separate categorizer. The classification may be hard (e.g., "1" if the object is assigned to the category or "0" otherwise), or can be soft (e.g., the classification output is a value between 0 and 1 inclusive with higher values indicating a higher confidence of belonging to the category). A soft classification can be converted to a hard classification by thresholding the confidence level. Typically, the categorizer has adjustable parameters whose values are determined by training with a labeled training set. The objective of the training is to select the adjustable parameters such that the output of the categorizer substantially agrees with the classification labels assigned to the objects of the training set.

One problem which arises is that as the number of categories is increased, an image may be labeled with a large number of categories, each with an associated confidence that the image is assigned to that category. Providing a user with all this information may not be useful if a user is only interested in the most probable categories. However, there tends to be variability in the capabilities of the categorizer over the categories, and so establishing an arbitrary threshold confidence level may result in some categories being more prominent in the output than would be expected based on visual examination. In the case of image retrieval, failure to establish a threshold may result in the retrieval of a large number of tagged images for review, and the associated problems of data transmission and storage.

Incorporation by Reference

The following references, the disclosures of which are incorporated herein by reference in their entireties, are mentioned:

The following references disclose systems and methods for categorizing images based on content: U.S. Pat. No. 7,680,341, issued Mar. 16, 2010, entitled GENERIC VISUAL CLASSIFICATION WITH GRADIENT COMPONENTS-BASED DIMENSIONALITY ENHANCEMENT by Florent Perronnin; U.S. Pub. No. 2007/0005356, entitled GENERIC VISUAL CATEGORIZATION METHOD AND SYSTEM by Florent Perronnin; U.S. Pub. No. 2008/0069456 entitled BAGS OF VISUAL CONTEXT-DEPENDENT WORDS FOR GENERIC VISUAL CATEGORIZATION, by Florent Perronnin; U.S. Pub. No. 2009/0144033, published Jun. 4, 2009, entitled OBJECT COMPARISON, RETRIEVAL, AND CATEGORIZATION METHODS AND APPARATUSES, by Yan Liu, et al.; U.S. Pub. No. 2010/0098343, published Apr. 22, 2010, entitled MODELING IMAGES AS MIXTURES OF IMAGE MODELS, by Florent Perronnin, et al.; U.S. application Ser. No. 12/483,391, filed Jun. 12, 2009, entitled ACCURATE AND EFFICIENT CLASSIFICATION OF FISHER VECTORS, by Florent Perronnin, et al.; and U.S. application Ser. No. 12/541,636, filed Aug. 14, 2009, entitled TRAINING A CLASSIFIER BY DIMENSION-WISE EMBEDDING OF TRAINING DATA, by Florent Perronnin, et al. See also, Florent Perronnin, Christopher R. Dance, Gabriela Csurka, Marco Bressan: Adapted Vocabularies for Generic Visual Categorization. ECCV (4) pp. 464-475 (2006); Florent Perronnin, Christopher R. Dance: Fisher Kernels on Visual Vocabularies for Image Categorization. IEEE CVPR, (2007); Gabriela Csurka, Jutta Willamowski, Christopher R. Dance, Florent Perronnin: Incorporating Geometry Information with Weak Classifiers for Improved Generic Visual Categorization. ICIAP pp. 612-620 (2005).

U.S. application Ser. No. 12/820,647, filed Jun. 22, 2010, entitled PHOTOGRAPHY ASSISTANT AND METHOD FOR ASSISTING A USER IN PHOTOGRAPHING LANDMARKS AND SCENES, discloses one application of a visual classifier.

BRIEF DESCRIPTION

In accordance with one aspect of the exemplary embodiment, a method for digital object categorization or retrieval includes providing for graphically presenting a selector to a user. The selector includes a position which is variably adjustable within a range, by the user, to adjust a level of noise in at least one of digital object categorization and digital object retrieval. The range of the selector is normalized over a set of digital object categories based on scores output by a trained categorizer for each of a set of labeled test objects for each of the set of digital object categories and a label for each of the test objects. The method further includes receiving selector position information and providing for outputting results of the at least one of digital object categorization and digital object retrieval, based on the selector position information. One or more of the steps of the method may be performed with a computer processor.

In accordance with another aspect of the exemplary embodiment, a system for variably adjusting digital object categorization or retrieval includes memory storing instructions for presenting a selector with a position which is variably adjustable by a user to adjust a level of noise in at least one of digital object categorization and digital object retrieval. An impact of the selector on output of the digital object categorization or digital object retrieval is normalized over a set of digital object categories based on scores output by a trained categorizer for each of a set of labeled test objects for each of the set of digital object categories and a label for each of the test objects. A computer processor executes the instructions.

In accordance with another aspect of the exemplary embodiment, a method for assisting a user in variably adjusting a level of noise for digital object categorization or retrieval includes submitting a set of labeled test images to a probabilistic categorizer. The categorizer includes a categorizer model for each of a set of categories to generate scores for each of the labeled test images for each of the categories in the set. For each of the set of categories, threshold scores are computed, based on the generated scores for that category and labels of the test images. A selector is presented in a graphical user interface with a position which is variably adjustable by a user to adjust a level of noise in at least one of digital object categorization and digital object retrieval, the selector having been normalized over the set of digital object categories based on the computed threshold scores. One or more of the steps of the method may be performed with a computer processor.

DETAILED DESCRIPTION

Figure 1:
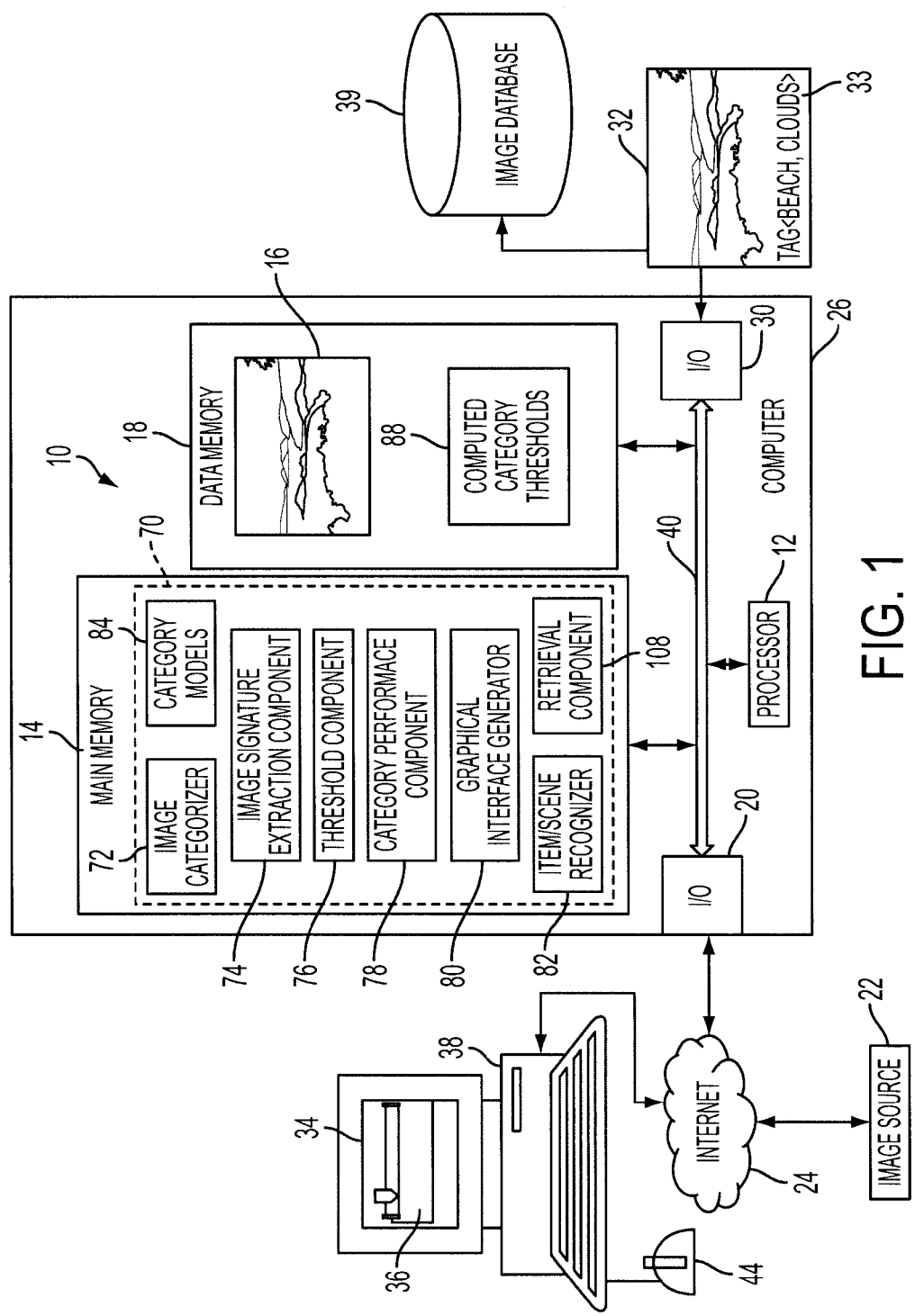
FIG. 1 is a functional block diagram of a categorization system and user interface in accordance with one aspect of the exemplary embodiment.

Aspects of the exemplary embodiment relate to a system and method for parameterizing the output of a categorizer (classifier), such as a visual categorizer, and to a user interface whereby a user is able to variably select an acceptable level of noise for categorization or retrieval.

As used herein a "digital object" (or simply, an "object") refers to a digital item which is capable of being categorized by a digital object categorizer, based on its content. A digital object can be an image, word document, audio file, combination thereof, or the like. In the exemplary embodiment, the objects are digital images, in particular, photographic images, i.e., captured images of real world visual (not digital) objects and scenes or images derived therefrom, although other types of images, such as graphics, maps, scanned documents, and the like are also contemplated. While particular reference is made herein to images, it is to be appreciated that the system and method are not limited to images. A "test object" is a labeled digital object used for establishing category parameters (such as threshold model proximity scores) for a trained digital object categorizer.

In the categorization and category-based retrieval fields, precision and recall are two widely used statistical evaluation measures of the performance of a system or method. In the category-based retrieval field, where digital objects are being retrieved from a collection based on their assigned categories, precision is the number of digital objects correctly retrieved by a search divided by the total number of digital objects retrieved by that search, and recall is the number of digital objects correctly retrieved by the search divided by the total number of digital objects in the collection which should have been retrieved. In the categorization field, where the digital objects are being categorized, precision is the number of digital objects correctly labeled as belonging to a given category divided by the total number of digital objects labeled as belonging to the category, which includes the incorrectly labeled digital objects. Recall, in this context, is the number of correctly labeled digital objects divided by the total number of digital objects in the collection which should have been labeled with the category.

The terms true positives, true negatives, false positives and false negatives are often used to compare the given category of a digital object (the category label assigned to the digital object by a categorizer) with the desired correct category (the category to which the digital object actually belongs). A true positive is a digital object which has been labeled with a category and where the label is correct (based on human visual (or aural in the case of sound) observation). A false positive is a digital object which has been incorrectly labeled with a category. A false negative is a digital object which should have been labeled with the category, but which has not. A true negative is a digital object which has not been labeled with a category and should not have been labeled. Based on these definitions, precision and recall rates can be defined as follows, where tp represents the number of true positives, fp the number of false positives, fn the number of false negatives, and tn the number of true negatives:

$$\text{Precision rate} = \frac{tp}{tp + fp} \quad \text{Eqn. 1}$$

$$\text{Recall rate} = \frac{tp}{tp + fn} \quad \text{Eqn. 2}$$

Three other measures can also be defined:

$$\text{Silence} = \frac{fn}{tp + fn} = 1 - \text{Recall rate} \quad \text{Eqn. 3}$$

$$\text{Noise} = \frac{fp}{tp + fp} = 1 - \text{Precision rate} \quad \text{Eqn. 4}$$

-continued $$\text{False Positives Rate} = \frac{fp}{tp + tn + fp + fn} \quad \text{Eqn. 5}$$

These five measures are all referred to herein as test-based measures, bearing in mind that other test-based measures which are a function of one or more of tp, fp, tn, and fn are also contemplated. In the exemplary embodiment, these test-based measures can be determined on a labeled test object data set and can be used as predictors of categorizer performance on new digital objects. One or more of these test-based measures is used in the exemplary method to parameterize the output of a categorizer. In particular, a window defined by upper and lower thresholds is computed for scores output by a digital object categorizer over some or all categories. A user is provided with a selector for variably adjusting, within this window, the parameters, which impacts the output of the categorizer and affects the labeling of images. Users can set their acceptable level of noise (and hence their acceptable level of silence) for performance, by the categorizer, on digital objects. In the case of digital object categorization, this indirectly adjusts the number of category labels applied to a given digital object. In the case of digital object retrieval, this indirectly adjusts the number of digital objects retrieved.

The exemplary systems and methods find application in a number of categorization and retrieval applications including:

1) Auto-tagging of images: this involves the provision of a list of visual labels (tags) that, in some embodiments, can be manually edited and complemented (e.g., with conceptual, emotional, and/or aesthetic labels).

2) Content-based image retrieval (e.g., finding and/or sorting all images of cats).

3) Item recognition, e.g., recognition of visual objects which form part of the content of an image, such as "person," "ball," "building," etc., scene identification (e.g., interactive systems based on the analysis of scene capture-see, for example, above-mentioned application Ser. No. 12/820,647), or recognition of sound objects which form part of a sound file, such as "music component", certain types of "noise" ("transportation", "urban", "industrial"), or voice, etc.

In the case of categorization, such as application 1), overall performance of the system can be measured in terms of the average number of category labels (tags) assigned per image, whereas the overall performance in the case of image retrieval, such as application 2) can be measured in terms of the average number of images per category label, and the overall performance related to application 3) can be measured as the probability of finding the relevant category labels within the top n (e.g., n=1, 2 or 3) guessed labels.

The users of the exemplary system may be end-users or integrators of a web service. For some applications, a web service may transmit raw tagging output (e.g., for an image to be categorized, a confidence level associated with each category among all that are available) which is then further processed by user software at the user's location. For other applications, the categorization output may be filtered prior to transmission, depending on the user's application needs with regard to the level of noise acceptance. This embodiment is particularly suited to application 3) and for cases where bandwidth or storage capacity is constrained and therefore it is desirable to transmit only those category labels that are relevant, rather than the complete list.

The exemplary system may employ from 10 to 1000 categories, or more, e.g., at least 100 categories or at least 500 categories. Each category generally describes human-perceptible content of the digital object. Each category has an associated label, such as "beach," "bird", "urban," or "winter sports," which may broadly describe the category, although for some applications, category labels may be alphanumeric sequences, such as the letters of the alphabet. In some embodiments, a more generic category may include a set of more specific sub-categories.

FIG. 1 illustrates an exemplary computer-implemented categorization/retrieval system 10 in accordance with one aspect of the exemplary embodiment. The system 10 includes a processor 12, which controls the overall operation of the system 10 by execution of processing instructions which are stored in main memory 14, in communication with the processor 12. An object, such as image 16, to be categorized by the system 10 may be stored in data memory 18 during processing. Computer system 10 also includes a network interface 20 for receiving the image 16 from an image source 22, such as memory of a personal computer, web server, database, portable memory storage device, scanner, camera, or the like, e.g., via a wired or wireless connection 24, such as a local area network or wide area network, such as the Internet. The system is hosted by one or more computing devices 26, such as a server.

A network interface 30 outputs a labeled image 32, which has been processed by the system 10. The labeled image may include, within the image itself, or in a separate file, one or more labels 33 assigned to the image on the basis of the content of the image as well as a confidence level for the label, which in the exemplary embodiment, is based on a model proximity score for the image for the corresponding category. The labels may be in the form or metadata, hypertext, or the like. The network interface 30, which may be the same as or separate from network interface 20, may output the processed image 32 to a graphical user interface (GUI) 34 for displaying the labels to a user on a display 36 of a user's computing device 38, here shown as personal computer, which may include memory 20 and a processor communicatively connected thereto. In the exemplary embodiment, the system 10 is hosted by a web server 26 and the user accesses the system 10, or a web service utilizing the system, via a web browser on the user's computer 38. In other embodiments, the system is hosted entirely or in part by the user's computer. In some embodiments, the processed image 32 may be output to a memory storage device 39 for post processing, querying, or the like. The various components 12, 14, 18, 20, 30 of the computer device 26 may be connected by a data/control bus 40.

Figure 2:
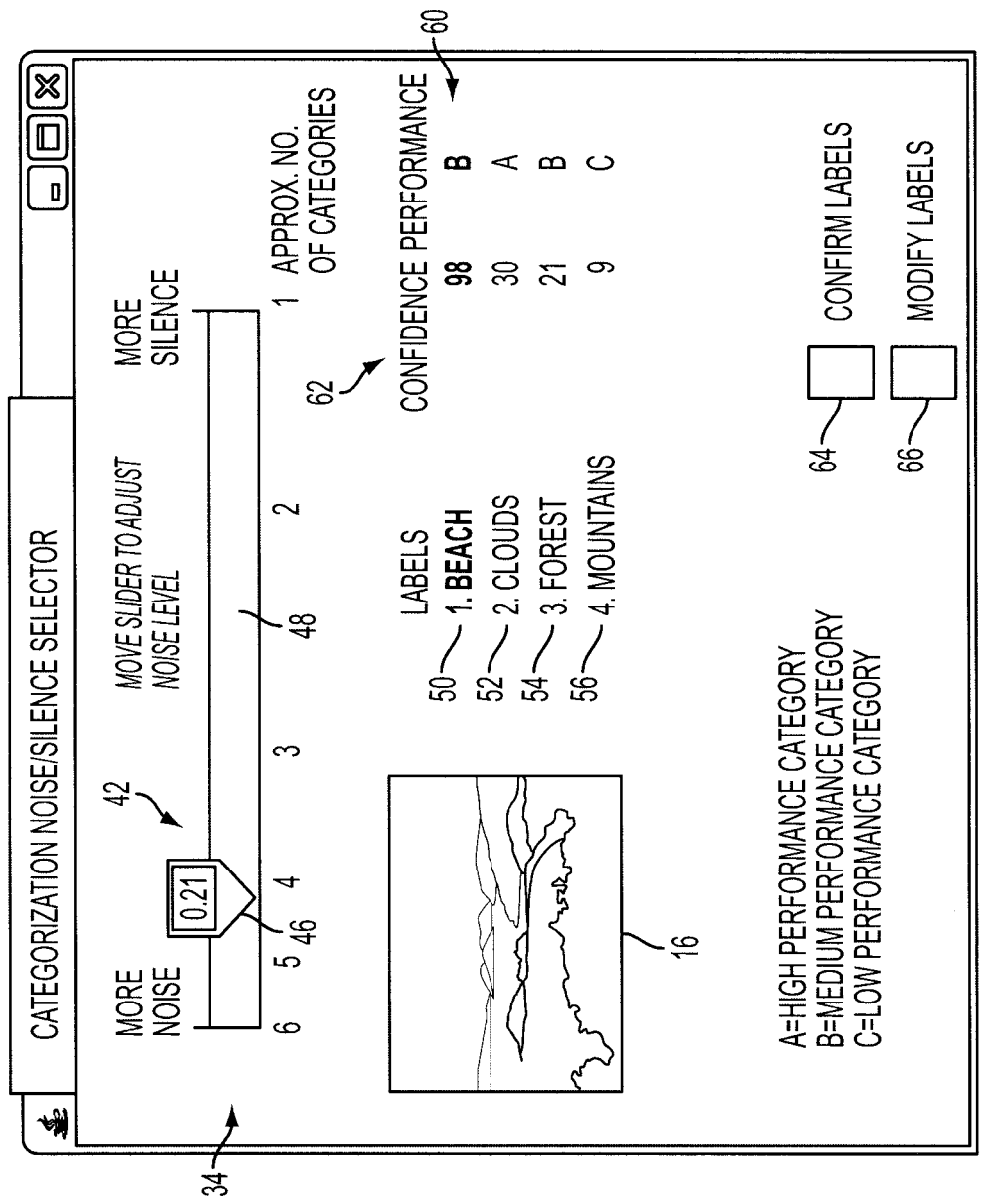
FIG. 2 is an exemplary screenshot of the user interface of FIG. 1 configured for digital object categorization.

With reference also to FIG. 2, a screenshot of an exemplary graphical user interface 34 is illustrated as a pop up window which may be displayed on the user's screen. GUI 34 may be generated by the system 10, alone or in cooperation with software stored on the user's computing device 38 or accessible thereto, when a user selects an image categorization mode. Within the GUI, a user-operable selector 42, such as a slider is presented. The slider allows a user to variably select their acceptable level of noise between predetermined maximum and minimum (threshold) values and thereby influence whether the system 10 is more heavily weighted toward recall (high noise-low silence) or towards precision (low noise-high silence). For example, the user operates a cursor control device 44 (FIG. 1), such as a mouse, joystick, keyboard, keypad, or the like, to click on a cursor 46 of the slider 42. The user can drag the cursor along a slider bar 48 between the maximum and minimum levels corresponding to high silence (low noise) and high noise, respectively, to select a noise level. One or more labels 50, 52, 54, 56 for the image 16, which have been output by system 10, are displayed on the GUI 34, depending on the position of the slider 42. For example, if the slider's cursor 46 is shifted to the right (lower noise), fewer of the labels are displayed. In one embodiment, labels 52, 54, and 56 progressively fade out, as the slider is moved, until only label 50 remains. The fading can be achieved by use of progressively lighter font, or two or more levels of font darkness. Such a fading effect could alternatively be implemented with other visual effects, such as a color change, a size change, a font change, a blinking speed, or a combination thereof, which will all be generally referred to herein as fading. The fading effect can be superposed with a visual representation of the numbers (or predicted numbers) of labels (in the context of categorization) or images (in the context of retrieval) at the two extremes of the user-selectable range within the two thresholds.

As will be appreciated, while the slider cursor 46 is shown in FIG. 2 as being movable from left to right, or vice versa, in other embodiments, the slider 42 can be arranged vertically (or at any other angle), in which case, the minimum and maximum values may be at the top and bottom of the bar 48, respectively, with the cursor 46 being movable up and down between the maximum and minimum values.

In one embodiment, the cursor 46 is configured for displaying a numerical value, such as a value between 0 and 1 inclusive, which is a function of the position of the cursor. For example, at the position shown in FIG. 2, the cursor is displaying a value of 0.21, which increases as the cursor is moved to the right. In some embodiments, a user can enter a value which sets the cursor position, such as entering the value 0.21 on a keyboard, which moves the cursor to the position shown in FIG. 2. Or, the user may use left and right (or up and down) arrows on the keyboard to move the cursor.

In the exemplary embodiment, a single selector 42, which applies to all categories, is used. Moving the slider 42 to a given cursor position varies the output of the image categorizer (i.e., the list of categories to which an image is recognized to belong) in a normalized and consistent way between the noise and silence thresholds across all categories. The behavior of the single slider is normalized across all categories by computing the silence and noise thresholds in a way which is consistent across all categories, as described in greater detail below.

In another embodiment, a plurality of selectors may be provided, such as two, three, or more. Each of the plurality of selectors covers a respective subset of the image categories, each subset including two or more categories. In one embodiment, each category is in only one subset. Each subset may cover a broad group of image categories, e.g. one for natural scenes (e.g., beach, snow, mountain, etc.), another for wildlife (e.g., cats, dogs, birds, etc), yet another for sports and hobbies, and so forth.

The slider 42 is displayed on the user interface 34 in a way that intuitively and visually conveys the notions of precision and recall so that users can grasp these concepts and identify their needs with respect to these. To visualize what precision/recall means in the case of categorization of an image, the exemplary slider shows the number (or predicted average number) of category labels 52, 54, 56, 58 with which an image is likely to be labeled at the two extremes of the user-selectable range within the two thresholds.

When users request a categorization to be performed on a digital object such as an image 16, they may be interested more in precision (i.e., as little noise as possible) or more in recall (i.e., as little silence as possible) for the category labels that will be returned by the categorizer system 10. This may depend on the user's application. The exemplary interface 34 provides for a user to select, within a range, whether to favor precision or recall, and by how much. For example, the slider 42 allows the user of an image categorization web service employing the system 10 to adjust their precision vs. recall needs (and therefore the number of category labels in the output of the image categorizer system) between a maximal silence value (silence threshold) and a maximal noise value (noise threshold) when they submit a categorization request to the web service (for a single image or for a batch of two or more images).

In one embodiment, the interface 34 provides overall category performance information 60 for the categories with which the image is labeled or for all categories. For example, the labels A, B, and C are used to denote high, medium, and low category performance, respectively. Other ways of providing category performance information 60, such as with color, font type, or the like, may alternatively be used. The displayed information may also include a confidence level, such as an estimated precision score 62, e.g., a percentage, which denotes how confident the system 10 is that the label is correct for that image. In the exemplary embodiment, this is computed based on a model proximity score for the image, as described below. An accept button 64, or other widget, allows a user to accept the displayed labels. A modify button 66, or other widget, brings up another screen through which a user can modify the labels, e.g., remove and/or add labels.

The slider 42 can be used by an integrator or an end-user of the categorization web service. In the latter case, some client software may be provided on the user's computing device 38, for example, as installed software in computer memory implemented by a processor. This allows the end-user to operate the slider 42 and vary the output of the image categorizer in a computing environment that is not connected to the image categorizer web service. In this case, for a given input image, some of the category labels may fade before others on the user interface display, depending on the relative position of the slider and the scores obtained by the image for the various categories. The category labels displayed on the image categorizer output can also be ranked by confidence levels, or by the order in which they will fade.

Figure 4:
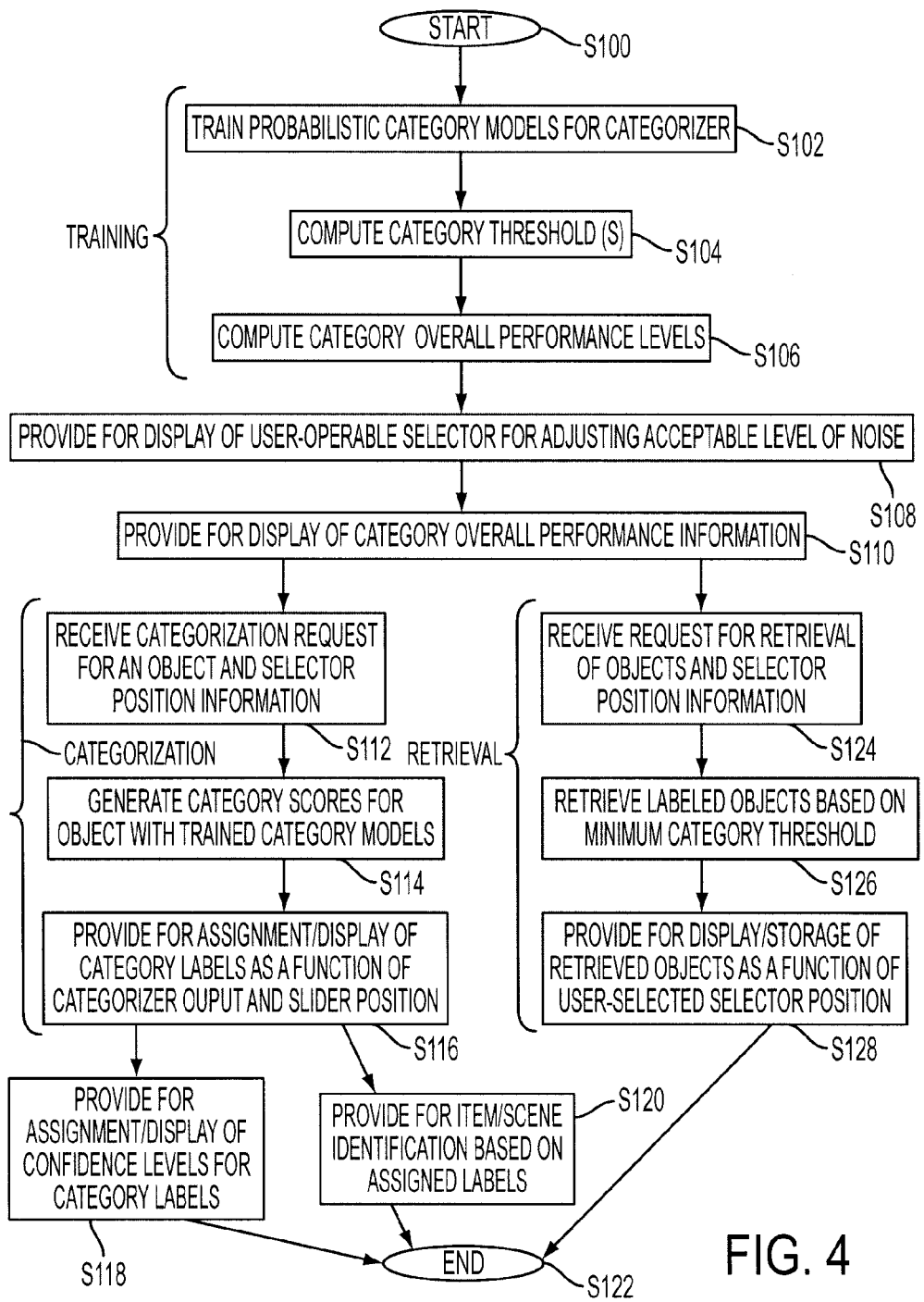
FIG. 4 is a flow diagram of a method for training a system and for categorization/retrieval of digital objects with the trained system.

Returning once more to FIG. 1, the processor 12 executes instructions 70 stored in memory 14 for performing the method outlined in FIG. 4. In particular, memory 14 stores various software processing components implemented by the processor 12, including a categorizer 72, an image signature extraction component 74, a threshold computation component 76, a category performance component 78, a graphical interface generator 80, and optionally an item/scene recognizer 82. However, it is to be appreciated that while separate software components are shown, these may be combined or split or interact with remotely located software components in performance of the method. Processing components 72, 74, 76, 78, 80, 82 may alternatively be in the form of hardware. In some embodiments, one or more of these components may be omitted.

The categorizer 72 may be any suitable probabilistic classifier. In the exemplary embodiment, the categorizer 72 includes or has access to a set of category models 84, one model for each category in a set of categories with which an unclassified digital object 16 has the potential to be labeled. The models 84 are trained on a training set of training objects, or more specifically, extracted object signatures, and respective object labels. Each training object is a digital object which has been manually labeled with at least one category from the set of categories. The training set of objects (or their extracted signatures) may be stored in a database 39, resident on, or in communication with, the computing device 26. Each object signature may have been extracted from the respective digital object by the extraction component 74, based on low level features of the object. For a new object to be labeled, the model 84 outputs a model proximity score e.g., in the range [0, 1], which expresses how close the image signature is to the model and, by inference, the confidence level with which the object should be labeled with the category corresponding to the model.

The threshold component 76 establishes, for each trained category model 84, thresholds 88 defining the range of model proximity scores over which the slider 42 is to operate for that category. These threshold model proximity scores 88 may be stored in memory 18. For example, if the model proximity scores are all output by the category models 84 in the range [0, 1], the slider 42 may operate, for a given category, within a range [x,y], where x>0 and y<1 and where the minimum threshold x (corresponding to high noise, for example) and maximum threshold y (corresponding to low noise), for a given category, are a function of one or more of the test-based measures described above. In this way, the model proximity scores over which the slider 42 operates for a first category can differ from those over which the slider operates for at least a second category.

The category performance component 78 computes an overall performance level for each of the category models 84 based on one or both of the thresholds x, y. The category overall performance levels 60 may be displayed on the GUI 34, either in the same window, as shown in FIG. 2, or in a separate window.

In the case of image categorization, the graphical interface generator 80 generates the GUI for display of the slider 42 and optionally also for display of labels applied to image 16, e.g., via a web browser operating on the user's computer 38. When a user confirms the displayed labels, e.g., by clicking on the button 64 (FIG. 2), the labels are associated with the image 16. In other embodiments, the image(s) 16 may be automatically labeled in an unsupervised fashion, based on the previously selected slider position. The labeled digital object 32 may be stored in memory, such as database 39, for subsequent label-based querying, accessible, for example, on a photo-sharing website. Or, the image 32 may be stored locally, for querying by users on a local area network, such as a company network.

The item/scene recognizer 82 takes the labels assigned to a new image, and optionally its image signature and other information, such as GPS position data, date, and time information, which may be stored with the image as metadata, and compares this information with the image signatures and labels of a set of images of known items/scenes, such as well-known landmarks, particular people, and so forth. The item/scene recognizer 82 outputs the name of an item or scene based on the comparison.

Figure 3:
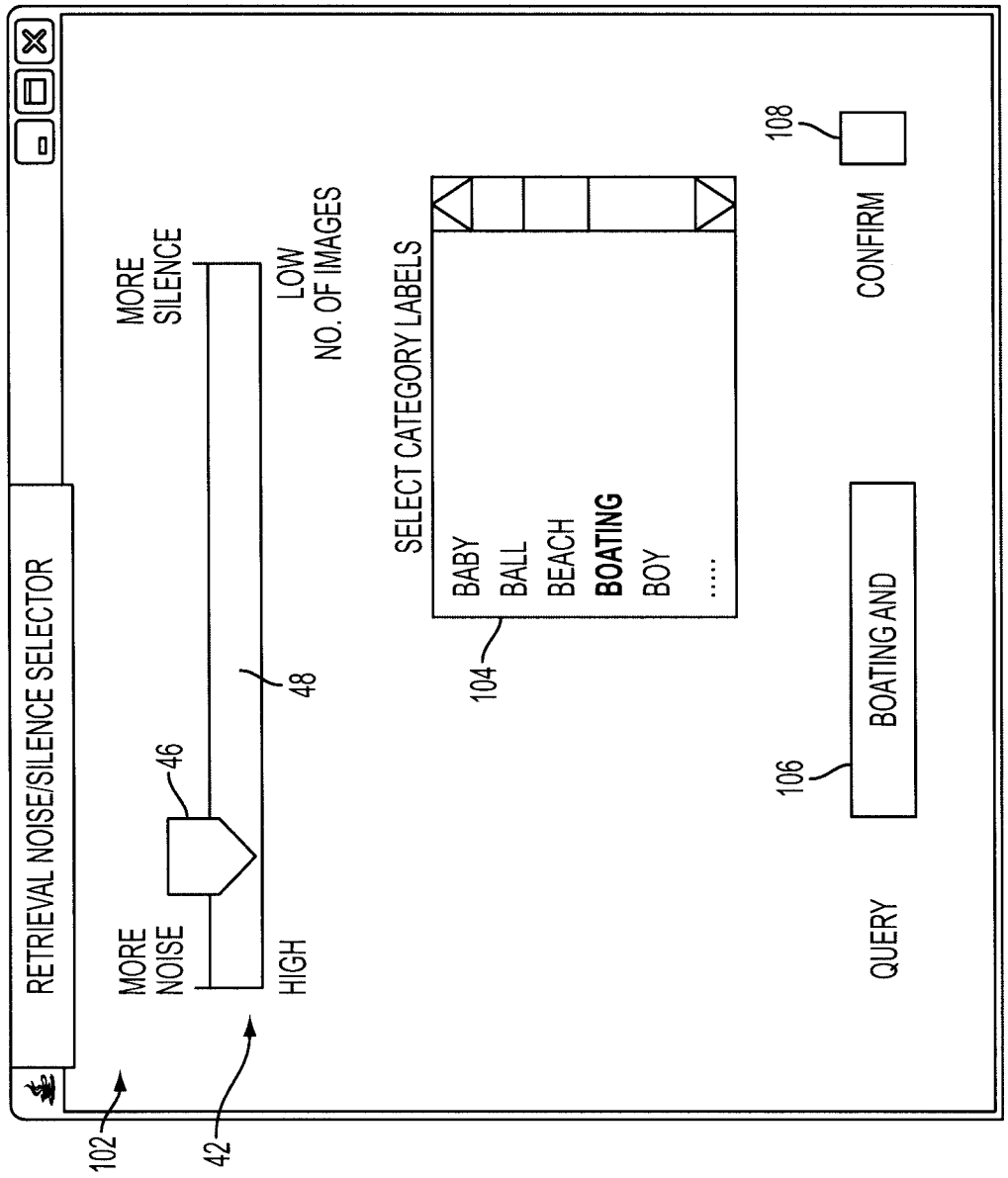
FIG. 3 is an exemplary screenshot of the user interface of FIG. 1 configured for digital object retrieval.

As will be appreciated, system 10, or a separate system configured for retrieval of images, may be configured as for that of FIG. 1, but in this case, the images in a collection 39 are already labeled with category labels, either by the system 10 or otherwise. With reference to FIG. 3, in the case of image retrieval, the graphical interface generator 80 may generate a GUI 102, analogous to GUI 34. GUI 102 displays a selection mechanism in the form of a slider 42, which is used to select the user's acceptable level of noise between maximum and minimum levels. In this case, shifting the cursor 46 to right or left results in a decrease or increase, respectively, in the number of images retrieved. As for the slider of FIG. 2, the maximum and minimum levels are defined by a window of model proximity scores for each category, restricting the user's selection to model proximity values falling within the window. A query may be generated using a query selector 104, where a user can select from a drop down menu which lists the selectable categories and/or by typing letters of a query in a query entry box 106 which are autocompleted based on the categories provided by the system 10. Retrieved images 32 may be displayed on the user's screen.

For this embodiment, the instructions 70 may include a retrieval component 108 (FIG. 1), which identifies images 32 from database 39 which have a label 33 which matches the query. If the images in the database 39 have already been labeled by the categorizer 72 with labels which are based on model proximity scores for all of the categories, the image signature extraction component 74, categorizer 72, and category models 84 can be omitted from the retrieval system. For images which simply have category labels (which may have been assigned by another system or by a user), the retrieval component 78 retrieves images with labels matching the query (which in this case, may not be an exact match). The image signature extraction component 74 and category models 84 are then used to generate model proximity scores for each of the retrieved images for at least some or all of the categories.

The computing device 26 and/or 38 hosting the exemplary system 10 may comprise one or more general or specific-purpose computing devices, such as a PC, such as a desktop, a laptop, palmtop computer, portable digital assistant (PDA), a server computer, cellular telephone, or other computing device capable of executing instructions for performing the exemplary method. In the exemplary embodiment, the system 10 is hosted by a server computer and is accessed over the Internet via a web browser on the user's computing device 38.

The non-transitory memory 14, 18 may be separate or combined and may represent any type of tangible computer readable medium such as random access memory (RAM), read only memory (ROM), magnetic disk or tape, optical disk, flash memory, holographic memory, or other non-transitory memory device. In one embodiment, the memory 14, 18 comprises a combination of random access memory and read only memory. In some embodiments, the processor 12 and memory 14 may be combined in a single chip.

The network interface(s) 20, 30 may be separate or combined and allow(s) the computer 26 to communicate with other devices via a computer network, such as a local area network (LAN) or wide area network (WAN), or the internet, and may comprise a modulator/demodulator (MODEM).

The digital processor 12 can be variously embodied, such as by a single-core processor, a dual-core processor (or more generally by a multiple-core processor), a digital processor and cooperating math coprocessor, a digital controller, or the like. The exemplary digital processor 12, in addition to controlling the operation of the computer 26, executes the instructions 70 stored in memory 14 for performing the method outlined in FIGS. 4, 5, and 7.

As will be appreciated, FIG. 1 is a high level functional block diagram of only a portion of the components which are incorporated into a computer system 10. Since the configuration and operation of programmable computers are well known, they will not be described further.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

By providing for performance based thresholds and incorporating these into an easily understood selector, the exemplary interface 34, 102 addresses various problems which may arise in categorization systems. For example, it avoids the need to display multiple user adjustable variables, such as precision, recall, and false positives rates. Further, these are concepts that are generally too technical to be described or explained on a user interface. The exemplary interface 34, 102, by provision of a user-operable selector 42, allows a user to see the effect of moving the selector on the categories shown. Additionally, a 100% precision rate would yield more silence than what is generally acceptable and 100% recall would yield more noise than what is generally acceptable. The selector therefore avoids these two extremes. In the exemplary embodiment, a threshold is established for each so that noise and silence values outside the thresholds are not selectable.

Another problem addressed is that, for a given category, selecting an arbitrary (e.g., 10%) noise threshold and an arbitrary (e.g., 20%) silence threshold may not be a satisfactory solution since there is a high degree of variability in the capabilities of the categorizer across the various trained categories. While a slider 42 could be provided for each category, a user would not be able to make use of these effectively without a detailed knowledge of categorizer performance. Moreover, with a large number of categories, a selector for each would prove unwieldy. In the exemplary embodiment, a single slider 42 is provided for all or at least a subset of the categories. The single slider takes into account the performance of the various categories it controls by determining the thresholds for each category separately and normalizing the slider values across the range between the two thresholds.

Since listing a large number of categories on a user interface is challenging and can be confusing to a user, in the exemplary embodiment, a ranking mechanism is used to rank categories globally by overall performance level (i.e., a performance level which is not specific to any one image). Alternatively or additionally, for an image that has been processed through the image categorizer 72, categories can be ranked by confidence level (e.g., an estimated precision score) that the particular image belongs to each category.

FIG. 4 illustrates a method for training a categorization/retrieval system 10 and using the trained system to categorize/retrieve digital objects. The method may be performed with the system of FIG. 1. The method begins at S100.

At S102, the categorizer 72 is trained. This may include computing a probabilistic category model 84 for each category through machine learning techniques using a set of labeled training images and their extracted image signatures.

At S104, threshold model proximity scores are computed for each category by the threshold component 76.

At S106, category overall performance levels are optionally computed by the category performance component 78.

At S108, provision is made by the GUI generator 80 for a user-operable selector 42 to be presented to a user for adjusting a level of noise to an acceptable level.

At S110, provision may be made for category overall performance level information 60 to be provided to the user.

In the case of categorization, the method then proceeds as follows:

At S112, a request is received from a user for categorization of one or more images 16. Selector position information may also be received in this step, or later, e.g., after S114.

At S114, the image is processed by the image categorizer 72. Specifically, a signature is computed for the image based on its content and the categorizer is used to output a model proximity score for each category, based on the image signature.

At S116, results of the categorization are output. For example, category labels are assigned to the image 16 in an unsupervised fashion and the image is automatically tagged. Or, the assigned labels may be displayed on the GUI 34 for review and approval by the user before the images are tagged. The assigned labels 33 are based on the model proximity scores and the position of the selector 42.

At S118, confidence level information 62 may be displayed and/or stored for the assigned labels.

At S120, in embodiments where the categorization is to be used for visual item/scene recognition, the labels assigned to the image may be input to the item/scene recognizer 82, which, optionally together with the image signature and/or other information extracted from the image, such as global position (GPS), date, etc., outputs information on an item and/or scene recognized in the image.

The method ends at S122.

In the case of image retrieval, the method can proceed from S108 or S110 to S124, as follows:

At S124, instead of receiving an image to be labeled, the user inputs a query comprising one or more categories to search and the query is received by the system 10. Selector position information may also be received by the system in this step and stored in memory, or later, e.g., after S126.

At S126, images are retrieved by the retrieval component 108, based on the query. For example, a search engine associated with the system 10 retrieves images from the collection 39 that are labeled with labels corresponding to the categories selected in the query.

At S128, provision is made for display/storage of retrieved images. For example, as the user adjusts the slider, the number of images displayed changes, depending on the position of the slider cursor. In other embodiments, only the images which correspond to a user's previously selected slider position are returned to the user for viewing.

The method ends at S122.

Further details of the system and method will now be described.

Image Signatures

Any suitable method for generating signatures for images may be used by the in the exemplary embodiment. The same method of signature extraction, or a compatible method with a compatible signature format, can be used for the training images to be used in training the model (S102), for the test images used for establishing the thresholds (S104), and for new digital images to be categorized (S114).

For example, the signature extractor 74 includes a patch extractor, which extracts and analyzes content related features of patches of the image 16, such as shape, texture, color, or the like. The patches can be obtained by image segmentation, by applying specific interest point detectors, by considering a regular grid, or simply by random sampling of image patches. The extracted low level features (such as vectors) from each patch can be concatenated to form a features vector which serves as the image signature. In other approaches, the feature vectors of an image are assigned to clusters. For example, a visual vocabulary is previously obtained by clustering low-level features extracted from training images, using for instance K-means. Each patch vector is then assigned to a nearest cluster and a histogram of the assignments can be generated. In other approaches, a probabilistic framework is employed. For example, it is assumed that there exists an underlying generative model, such as a Gaussian Mixture Model (GMM), from which all the vectors are emitted. In this case, the visual vocabulary can be estimated using the Expectation-Maximization (EM) algorithm. In either case, each visual word in the vocabulary corresponds to a grouping of typical low-level features. The visual words may each correspond (approximately) to a mid-level image feature such as a type of visual (rather than digital) object (e.g., ball or sphere, rod or shaft, etc.), characteristic background (e.g., starlit sky, blue sky, grass field, etc), or the like. Given a new image 16 to be assigned a signature, each extracted feature vector is assigned to its closest visual word in the previously trained vocabulary or to all visual words in a probabilistic manner in the case of a stochastic model. A histogram is computed by accumulating the occurrences of each visual word. See, for example, the above-referenced patent documents and Perronnin, F., Dance, C., Csurka, G., and Bressan, M., "Adapted Vocabularies for Generic Visual Categorization," in *European Conf. on Computer Vision*, (2006); and Csurka, G., Dance, C., Fan, L., Willamowski, J., and Bray, C., "Visual Categorization with Bags of Key-points," in *ECCV Workshop on Statistical Learning for Computer Vision* (2004).

For other examples of methods for generating image signatures based on image content, see, e.g., U.S. Pub. Nos. 2007/005356, 2007/0258648, 2008/0069456, 2009/014403, and 2010/00920843; Herve Jegou, Matthijs Douze, and Cordelia Schmid, "Improving Bag-Of-Features for Large Scale Image Search," in IJCV, 2010; Quelhas, P., Monay, F., Odobez, J.-M., Gatica-Perez, D., Tuytelaars, T., and Gool, L. V., "Modeling Scenes with Local Descriptors and Latent Aspects," in *ICCV* (2005), and Carbonetto, P., de Freitas, N., and Barnard, K., "A Statistical Model for General Contextual Object Recognition," in *ECCV* (2004).

Training the Category Models (S102)

Each of the models 84 is trained with a large training set of manually labeled images and their respective image signatures. Each model may be trained with both positive examples (training images labeled with that category) and negative samples (training images not labeled with that category) using, for example, sparse logistic regression, support vector machines, linear discriminant analysis, or any other suitable machine learning method. The trained models 84 are able to assign a score to an image, based on how close the image is to the category model (i.e., a model proximity score).

In the exemplary embodiment, a Generic Visual Classifier (GVC), as described, for example, in U.S. Pat. No. 7,680,341 is used for the category models.

Threshold Determination (S104)

Figure 5:
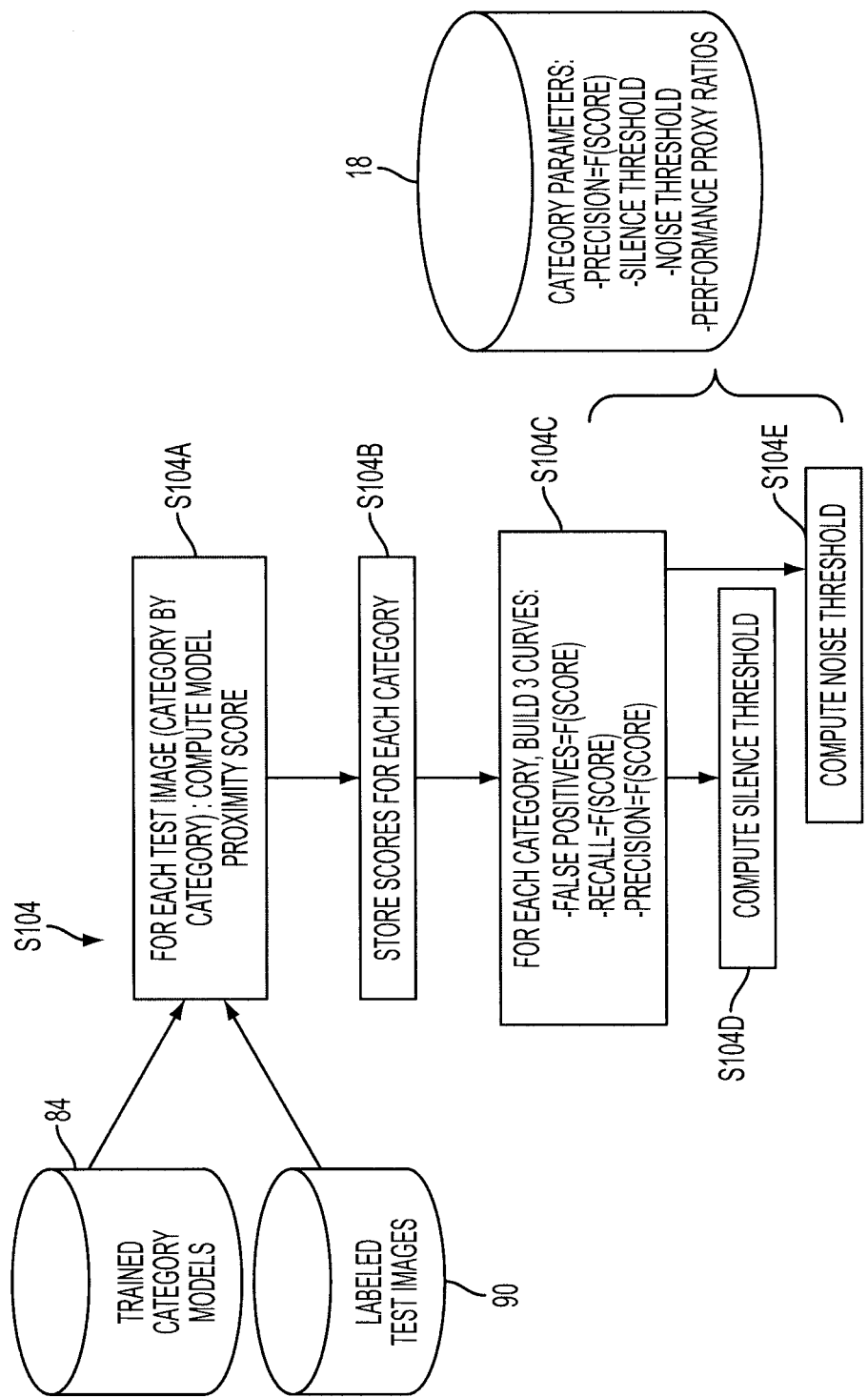
FIG. 5 is a flow diagram illustrating aspects of the method of FIG. 4 in accordance with one embodiment.

In this step, test images are processed with the trained models 84 to determine thresholds for the selected test-based measure(s). As illustrated in FIG. 5, this may include applying each trained category model 84 to a large collection 90 of mono-labeled test images, and computing a model proximity score for each test image (S104A). Thus, for each of the labeled test images in the set, scores are computed for all the categories (i.e., the one the image belongs to as well as all others to which it does not belong). In the exemplary embodiment, each test image in the collection 90 has a single, manually-applied label. In one embodiment, the mono-labeled test images are retrieved by entering the category label in a query which retrieves images via an on-line image sharing website. As will be appreciated, the label can be translated to another appropriate natural language or languages for the website, such as English. The retrieved image may have more than one label, in which case, the other labels not used in the query can be ignored (or can be assigned different weights depending on their rank order or any other way of determining their relative importances). The test images in the collection 90 may be different from the training images used in learning the parameters of the models (at S102), or different groups of images used for each in an N-fold cross validation.

At S104B, the scores for all the test images for a given category are stored, together with their "true" (based on human visual examination) labels.

Figure 6:
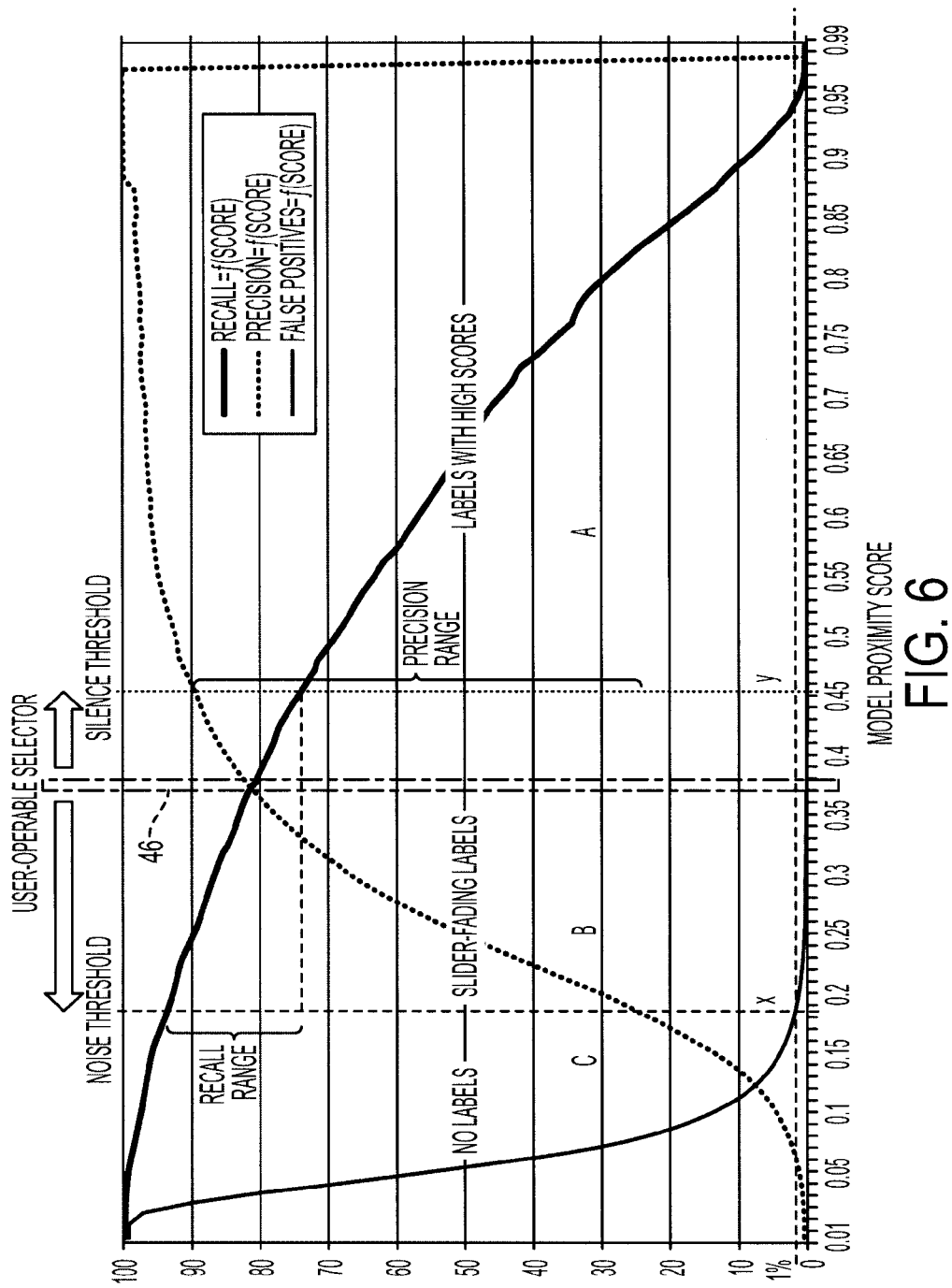
FIG. 6 shows plots of recall rate, precision rate, and false positives rate vs. category model proximity for a dataset of test images.

At S104C, test-based measures, such as recall rate, precision rate, and false positive rate, can be computed for a category, based on the real labeled test data, and expressed as predictive curves, in which the value of the respective test-based measure is plotted as a function of the scores (i.e., model proximity scores) output by the respective one class category model 84. In the exemplary embodiment, three curves per category are generated, as illustrated in FIG. 6 for an exemplary category "Fireworks":

1. Precision=f(score) (i.e., precision rate as a function of model proximity score).
2. Recall=f(score) (i.e., recall rate as a function of model proximity score).
3. False positives=f(score) (i.e., false positives rate as a function of model proximity score).

By way of example, in this step, for each of a set of model proximity scores (or scores) output by the model, such as the values 1-99, shown in FIG. 6, the recall rate, precision rate, and false positive rates are computed by identifying the images which have a score below this value (the negatives), and the images which have a score which is the same as this value or higher (the positives). Then, based on the labels of the images, the "negatives" are classed as either "true negatives," if the label is not the category label, or "false negatives," if the label is the same as the category label. The number of true negatives and false negatives for that score are stored. Similarly, the number of "true positives" is computed by identifying the "positive" images for which the label is the same as the category and the number of "false positives" by identifying the "positive" images whose label is not the same as the category label. Having determined tp, fp, tn, and fn, for a particular score, test-based measures, such as the precision rate, recall rate, and false positive rates can be computed based on Eqns. 1-5. In FIG. 6, these are expressed as a percentage on a scale of 0-100 (multiplying the ratio obtained by the respective equation by 100), or directly as ratios.

The computation of tp, fp, tn, and fn is repeated for each score so that sufficient values of precision rate, recall rate, and false positive rate are obtained to plot a respective curve. While FIG. 6 uses 100 discrete model proximity scores, which are incrementally spaced by an equal amount, it is to be appreciated that fewer or more scores may be used and they need not be equally spaced, and need not cover the entire range. For example, each curve may use at least 10 or at least 20 scores and can include up to 1000 scores.

As will be appreciated from FIG. 6, when the model proximity score is set at 0.01 in the range 0-1, all or virtually all of the test images in the collection will have a score which equals or exceeds 0.01 for a given category. Thus, the recall rate at this score is at or close to 100%, its maximum value. However, precision rate is very low, at or close to 0%, since few of the images with a score at or above 0.01 are actually labeled with that category. For higher scores, the recall rate drops, while the precision rate increases. However, the two curves are not simply mirror images of each other, as can be seen from FIG. 6.

At S104D and S104E, threshold model proximity scores 88 are defined for the respective category, based on the curves generated at S104C. The noise and silence thresholds 88 obtained are thus two category parameters which are stored on a category by category basis. In particular, the test-based measure curves are used to establish the thresholds x, y according to a predetermined set of rules which are based on cross-category parameters (parameters which are the same for each category). The cross-category parameters can include one or more of a selected false positives rate or change in false positives rate, a selected recall rate or a selected change in recall rate, and a selected precision rate or a selected change in precision rate. In the exemplary embodiment, the noise threshold x is computed as a function of the false positives=f(score) curve. For example, a false positives rate of 1% may be selected, as illustrated in FIG. 6. This establishes the model proximity score of the noise threshold, which in the case of the category shown in FIG. 6 is about 0.29.

It is to be appreciated that the noise threshold computation as a function of the false positives rate is dependent on the total number of categories. While a false positive rate of 1% is suited to an embodiment in which there are about 500 categories, this percentage may be optimized as a function of the number of categories and/or may be based on any specific customer requests to accept higher/lower levels of noise.

The silence threshold y may be computed as a function of the now established noise threshold x. For example the recall rate at the noise threshold x is determined from the recall rate curve. The silence threshold may be set at a recall rate (here %) which is a predetermined amount lower than this value, e.g., 20% lower in the illustrated embodiment. Since the recall rate is 94% at the noise threshold, the silence threshold is set at a recall rate of 74%. In FIG. 6, this corresponds to a model proximity score of about 0.47. This value may be modified based on the precision rate curve. For example, the silence threshold y may be further limited to no more than 90% precision rate, i.e., at a recall rate which is a maximum of 20% lower, and at no more than 90% precision rate. In another embodiment, the noise threshold may be limited to no less than a 25% precision rate, and/or the silence threshold may be set at a precision rate which is z % higher than the precision rate at the noise threshold, for example 65% higher.

The silence threshold can alternatively be based on the difference between the average number of displayed labels on the silence and noise thresholds, respectively. This ensures, for example, that the difference between the two thresholds equates to about a predetermined number (e.g., two, three, or four) displayed labels, on average. Where there are relatively few categories, or there is little overlap between categories, the difference between the two thresholds may equate to an average of one displayed label. In another embodiment, other parameters such as the number of categories, the number of hierarchical levels in the hierarchy of categories, the different numbers of categories per hierarchical levels in the hierarchy of categories, the number of categories (or sets of categories) that are flagged as being neutral with regard to each other, or any combination of these parameters and the above category parameters, may be used to compute the silence and noise thresholds.

In one embodiment, the two category parameters x and y are the averages obtained using N-fold cross-validation. In this embodiment, 1/Nth of the available image data set is used as the test data set for establishing the category parameters, and the remaining images are used as the training data set for training the category models, in N iterations.

In some cases, discrimination between certain categories is difficult, even though they may not hierarchically relate to each other. For example, consider the categories "bee" and "flower." The category models may be trained on images which include both as a consequence of there being multiple photographs captured when bees land on flowers. These category labels can be neutralized, in relation to each other, so that the false positives curves are not distorted. This neutralization approach can also be used in the case of more generic categories, such as "seascape," in order not to overflow the more specific ones, such as "boat."

In the exemplary embodiment, the training images and test images are selected without reference to the user's needs, and thus a large variety of training and test images are used, such as for example about 1,000,000 images, or more. However, in other embodiments, the training and test images may comprise user-supplied images, so that the sampling of the universe of images may be biased towards the users' sampling of the universe. This allows the category thresholds based on precision rate and recall rate across all categories to more closely match the needs of the users.

As will be appreciated, the same thresholds x and y can be applied irrespective of whether the task is categorization or retrieval. In other embodiments, different category thresholds may be defined, depending on the task. For example, if the task is always to retrieve a small number of images from a very large collection, based on a category search, the noise threshold may be set higher.

In a high performance category, such as that shown in FIG. 6, the False positives=f(score) curve falls rapidly, the Recall=f(score) curve is almost linear with a small slope and the Precision=f(score) curve has a steep slope with an inflection point. The shape of the three test-based curves varies, depending on the category.

For such a high performance category the score (i.e., model proximity score) obtained by an image can belong to one of three zones:

A) high score: the image should always be tagged with this category label as the score is above the silence threshold;

B) medium score: the category label should appear if the slider is moved towards a high recall goal, while the category label should disappear if the slider is moved towards a high precision goal;

C) low score: the image should not be tagged with this category label as the score is below the noise threshold.

Thus, in the case of a categorization system, images 16 with model proximity scores for the category "Fireworks" below the noise threshold are not tagged with the "Fireworks" label, irrespective of the slider position. For images with a model proximity score above the silence threshold, tags are always applied, irrespective of the slider position. It is thus only for images with model proximity scores ranging from the noise threshold to the silence threshold that the tags are influenced by the slider position. These tags fade out as the slider cursor moves toward the silence threshold. For example, in the case of FIG. 6, the slider cursor 46 is shown in phantom at a position which corresponds to a model proximity score of about 0.39 on a scale of 0 to 1. In this position, only those images with model proximity scores of at least 0.39 are labeled with the category and for those images with a model proximity score below the silence threshold, the label may be displayed in progressively lighter color to emphasize that the label is weak.

In the case of image retrieval, images with model proximity scores below the noise threshold would not be output to the user by the system for the query "fireworks."

Image Categorization

At run-time, for each input image (S112), its model proximity score (score) is computed for each category by inputting its signature to the respective model 84 (S114). Slider position information is also received by the system 10, based on the position of the slider. The position information can be in the form of a value corresponding to the slider position or other information computed therefrom.

For each category, the score obtained for the image is compared with the category's silence threshold, the category's noise threshold and the position of the slider, to identify the category labels that will be assigned and/or displayed at S116.

Figure 7:
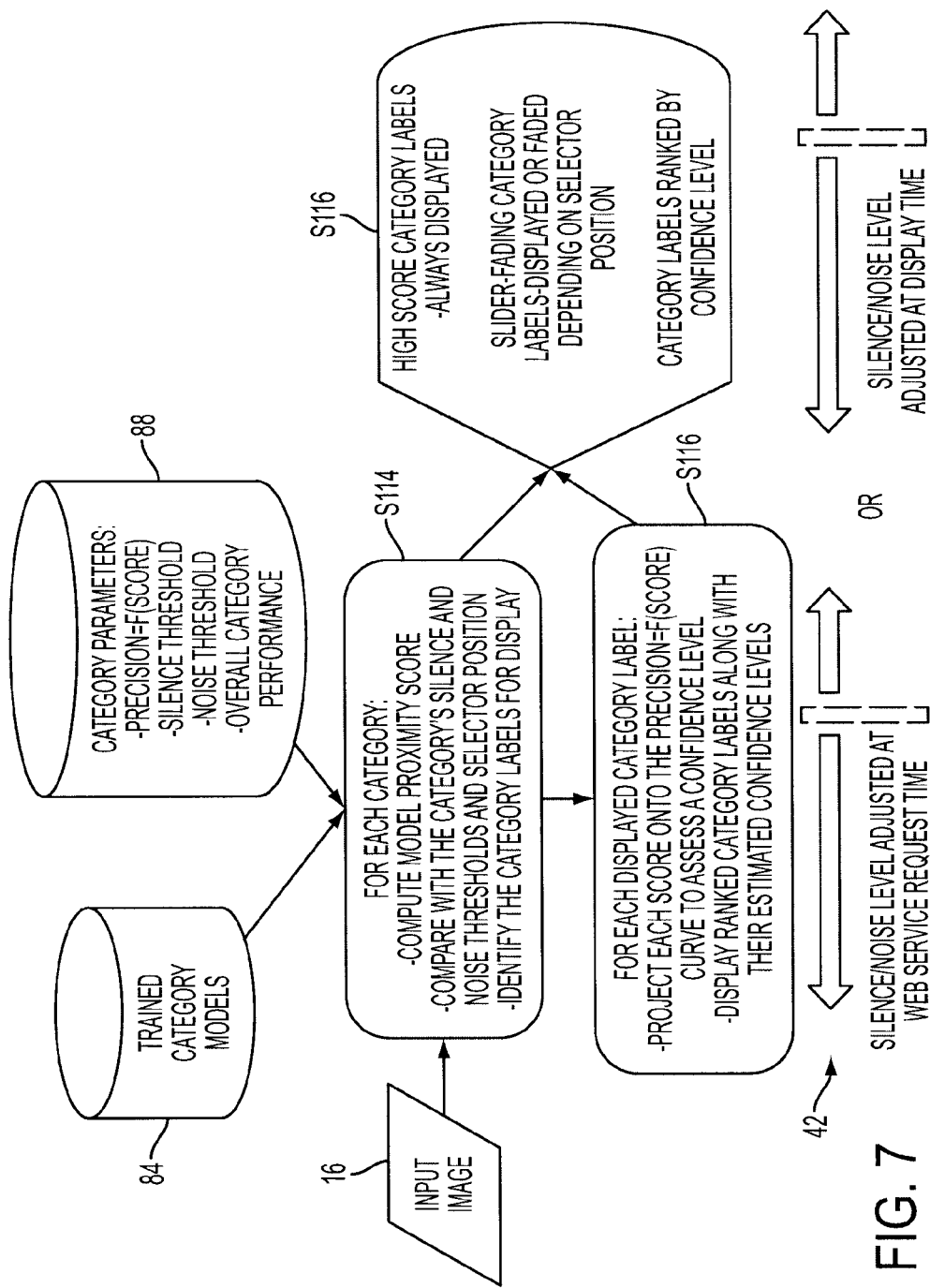
FIG. 7 illustrates aspects of the exemplary method of categorization of images in accordance with one embodiment.

FIG. 7 illustrates different ways in which the results of the categorization may be provided to the user. In one embodiment, the slider 42 is adjusted at the request time (S112) and only the labels which satisfy the slider position are returned to the user. In another embodiment, the slider is adjusted at display time (S116) and the number of displayed labels changes as the slider position is varied.

The labels may be displayed in a ranked order. For example, for each of the displayed category labels, the respective score is projected onto the Precision=f(score) curve of the relevant category (obtained in S104) to determine a confidence level (estimated precision score) 62 that the image belongs to such a category. The displayed category labels are then ranked by the level of confidence (estimated precision score). In this method of determining the confidence level, the different confidence levels for the labeled categories (or all categories) do not sum to a given value, such as 1 or 100.

In one embodiment, at display time, when the user views the output of the image categorizer, image by image, the image category labels are allowed to fade progressively, depending on the position of the slider, in the case of images with scores falling between the noise and silence thresholds. In other embodiments, the displayed labels may move from one area of the screen to another.

In other embodiments, the labels are not displayed to the user. In this embodiment, the label information may be simply output, e.g., to database 39.

Category-Based Retrieval

In one embodiment, images in the collection 39 may have been previously labeled with labels and processed with the categorizer of the system 10 to assign model proximity scores. In this embodiment, the retrieval component 108 retrieves the images in the collection which are labeled with the category (or categories) corresponding to the user's query and have at least threshold x for that category (or categories). If the slider position is submitted at query submission time (S124), the system returns only those images to the user that satisfy the slider position. If the slider position is set at display time (S128), all the images having at least threshold x for that category are retrieved and transmitted to the user, with the number of images displayed varying depending on the slider position. In other embodiments, the images are not displayed but are simply labeled with category information for subsequent processing.

Overall Category Performance (S106, S110)

Overall performance information 60 for the categories can be derived from the test-based curves. In one embodiment, the noise threshold x, determined as described above, Precision=f(score) curve, and Recall=f(score) curve are all used to rank the categories globally (i.e., not for a particular image) by overall performance level. For example, three performance levels (high, medium, low) may be defined and the various categories each assigned to one of the levels. This rank can be used to organize and/or display the list of categories (globally). The overall performance ranking for all categories can be provided prior to or at submission of a categorization (or retrieval) request or at any other time as information about the overall performance of the system is of interest. For example, users can access a webpage which shows the performance level for each of the offered categories. Additionally, in the case of categorization, the information may be useful when the user sees the output of the image categorizer (image by image), as shown in FIG. 2.

Figure 8:
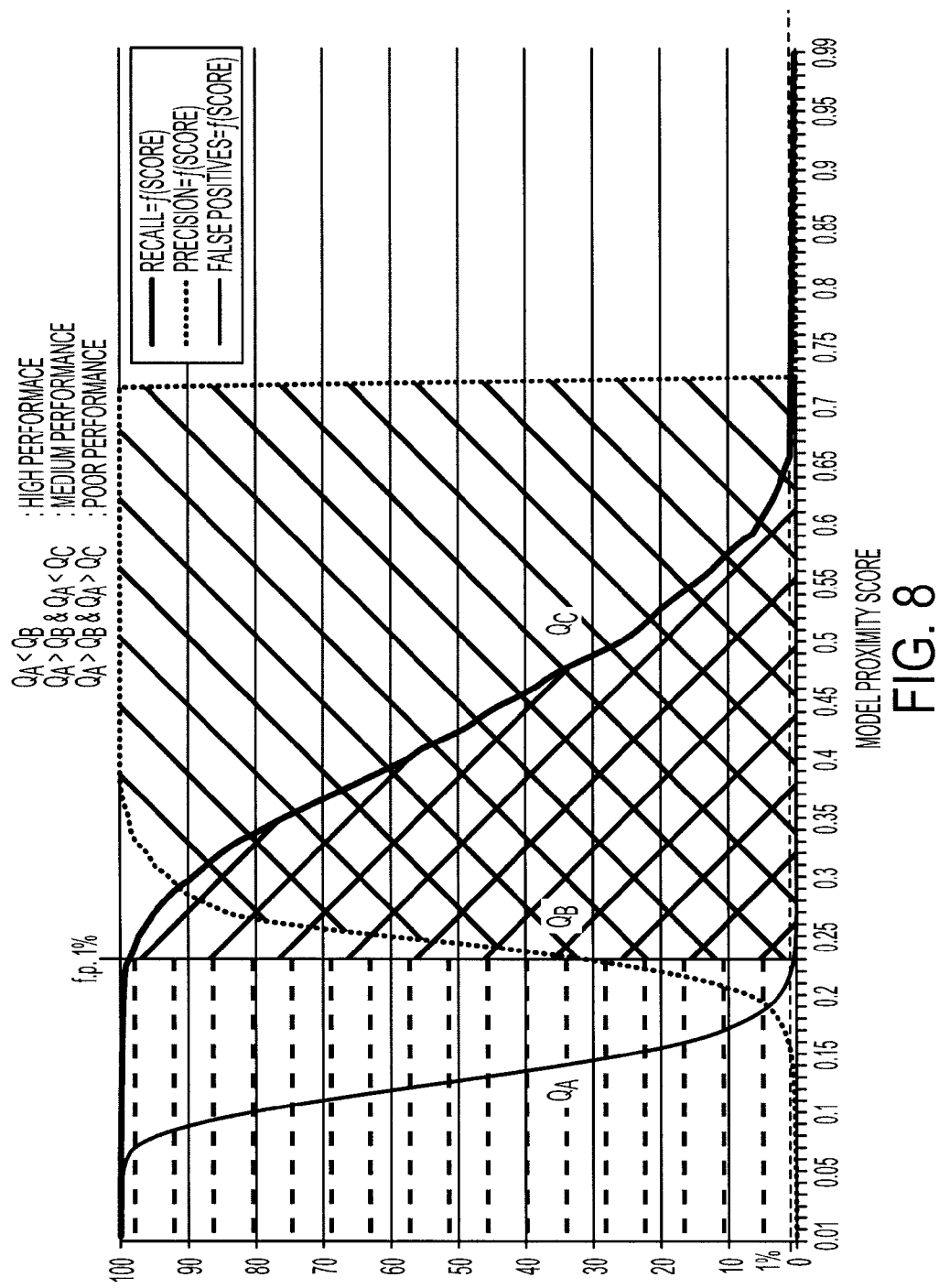
FIG. 8 illustrates plots of recall rate, precision rate, and false positives rate and their use in a method for determining performance of a category.

In one embodiment, as illustrated in FIG. 8, the performance level ranking is based on a comparison of the surface of three areas:

$Q_A$: area under the Recall=f(score) curve and below (left of) the noise threshold x;

$Q_B$: area under the Recall=f(score) curve and above (right of) the noise threshold x;

$Q_C$: area under the Precision=f(score) curve and above (right of) the noise threshold x.

For each category, the three curves are plotted on the same axes so that the results are comparable.

In one embodiment, a high performance category is defined as one where $Q_A<Q_B$; a medium performance category is one where $Q_A>Q_B$ and $Q_A<Q_C$; and a low performance category is one where $Q_A>Q_B$ and $Q_A>Q_C$. Other embodiments may use different segments of category overall performance, e.g., based on other arithmetic combinations of $Q_A$, $Q_B$ and $Q_C$.

Another way to approximate the performance by category is by computing the probability of guessing a test image's label (possibly identified as its primary label or one of its primary labels) (i) as the label with the highest confidence level (Top 1), (ii) as being one of the first two highest confidence labels (Top 2), or (iii) as being among the first three highest confidence labels (Top 3—see FIG. 8 as an illustration). In practice, the performance proxies estimated by the $Q_A$, $Q_B$, $Q_C$ method show a high correlation with the Top 1, Top 2 and Top 3 results.

In some embodiments, the category performance information may be used to filter out the categories having poor performance. In other embodiments, the poor performance categories are retained as they may be of relevance for those images with category scores which closely match the category model whereas based on the above thresholds they will not be assigned/displayed for those images with category scores distant from the category model.

Category confidence assessment for an individual input image (S118)

Figure 9:
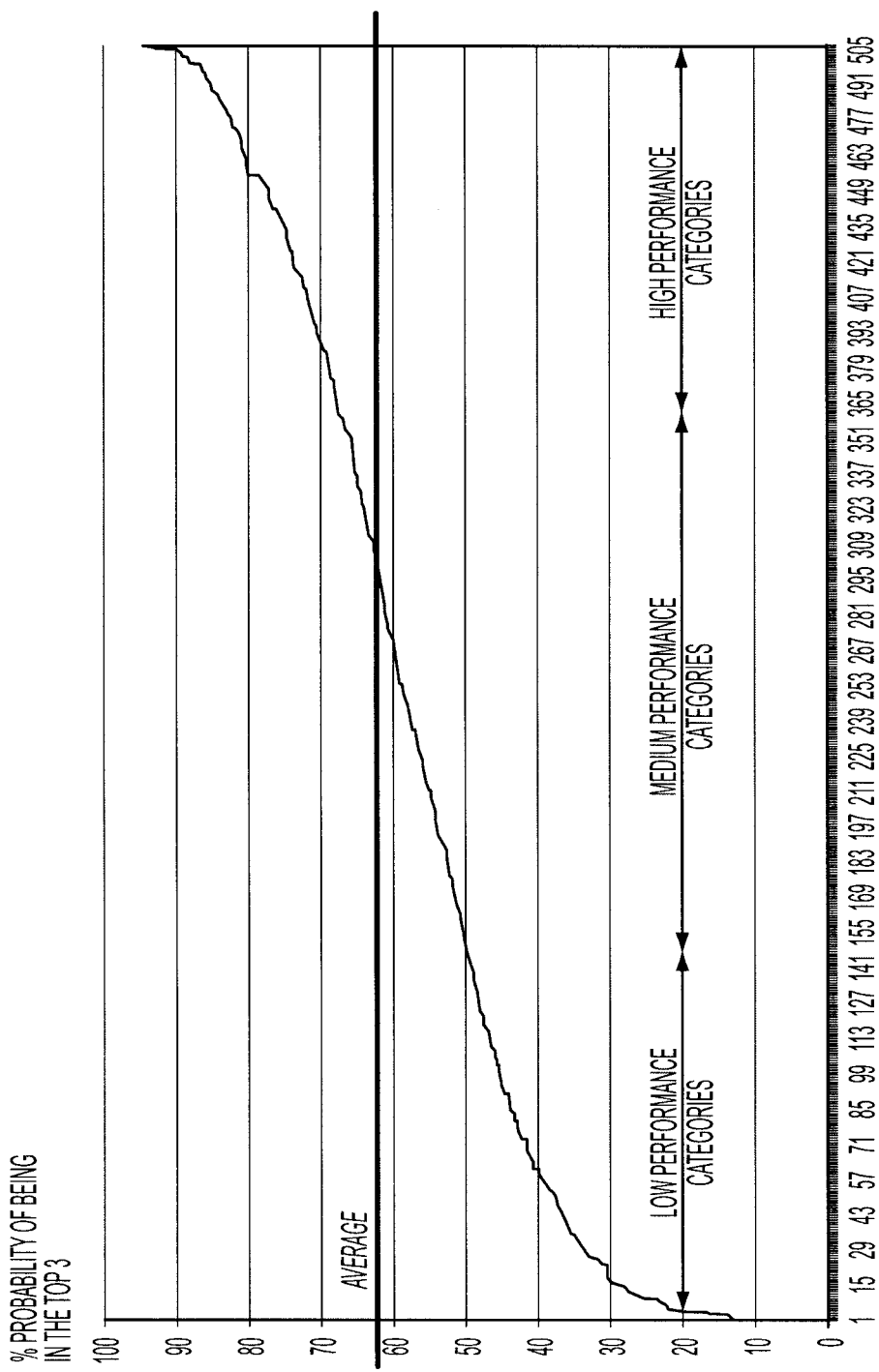
FIG. 9 is an exemplary plot of % probability of a manually labeled category being in the top three of those output by a category model for a set of 506 categories which can be used as a performance measure for each of the categories.
Figure 10:
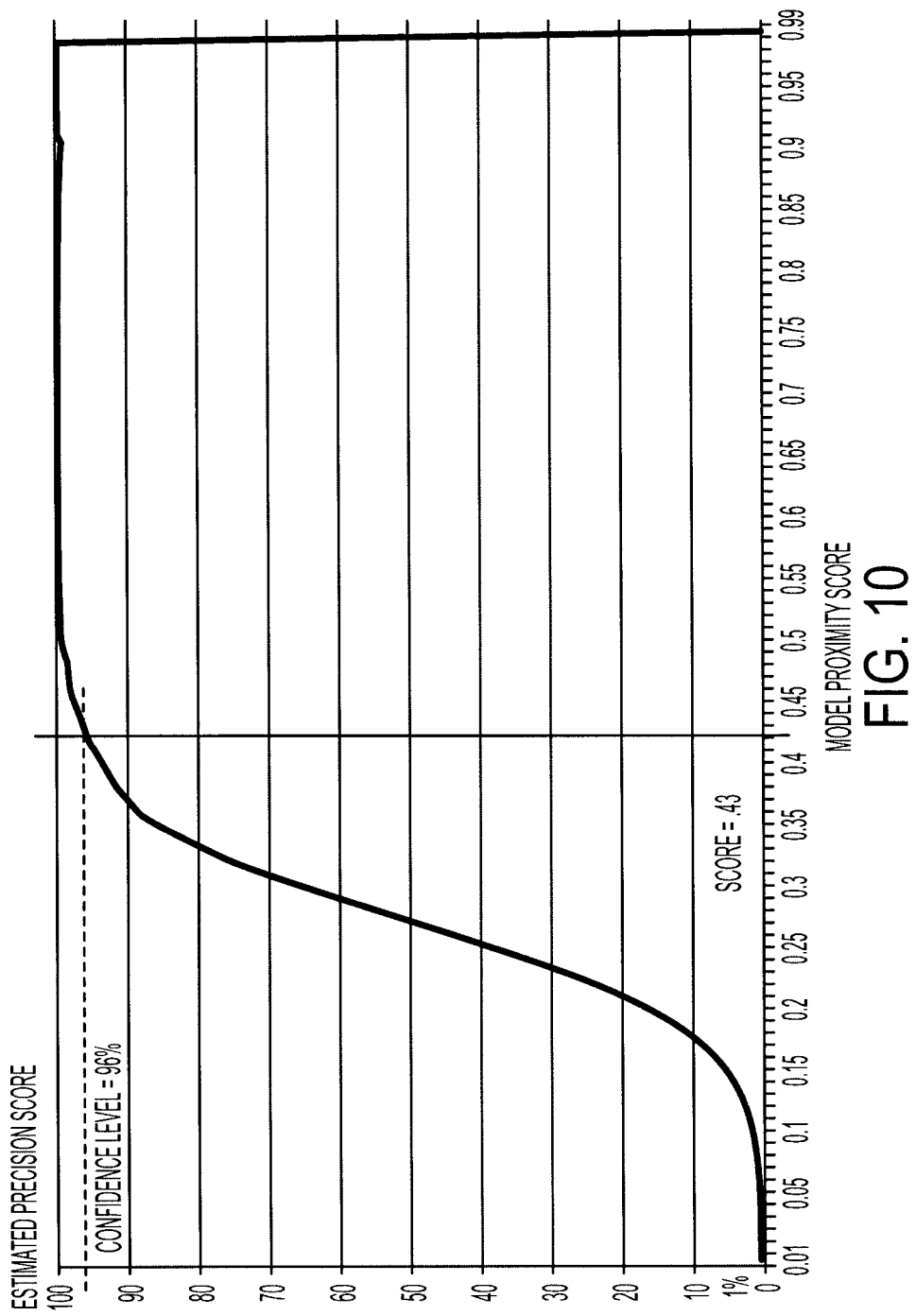
FIG. 10 is a plot of precision rate vs. model proximity score for a category demonstrating a method for assigning an estimated precision score to a model proximity score for a new image being categorized.

With a categorizer such as a generic visual classifier (GVC) the different scores (model proximity scores) obtained for an image for the various categories are not directly comparable with each other. To allow assignment of confidence levels and ranking the category labels by level of confidence, the Precision=f(score) curves for the categories may be used to project each score (model proximity score) obtained by the image and assess a confidence level (probability of true positive) that the image belongs to each category. FIG. 9 shows an example of a high-performance category for which a score of 0.43 on a scale of 0-1 results in a precision=confidence level of 96%.

The Precision=f(score) curve obtained at S104C may thus be stored, as a plot, a series of discrete value points, an approximate function, a sequence of approximate linear curves, a smoothened modeled function or another proxy, as a category parameter to transform scores into confidence levels, which can then be displayed, used to rank the displayed labels/retrieved images, and/or used to label the image(s). For example, the confidence levels may be displayed at 62, as illustrated in FIG. 2, either numerically, as shown, and/or as a bar of varying size and/or color, or other graphical representation.

Training an image categorizer to recognize up to about 500 categories poses some challenges to displaying and organizing categories. By ranking the categories by level of performance (S112), or by level of confidence for a given image (S118), the user's interaction with an image categorization web service can be improved.

The method illustrated in FIGS. 4, 5, and 7 may be implemented in a non-transitory computer program product that may be executed on a computer. The computer program product may be a computer-readable recording medium on which a control program is recorded, such as a disk, hard drive, or the like. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use. Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 4, 5, and 7 can be used to implement the exemplary method.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for digital object categorization or retrieval comprising:
providing for graphically presenting a selector to a user, the selector including a position which is variably adjustable within a range by the user to adjust a level of noise in at least one of digital object categorization and digital object retrieval, the range of the single selector having been normalized over a set of at least ten digital object categories based on scores output by a trained categorizer for each of a set of labeled test objects for each of the set of digital object categories and a label for each of the test objects;
receiving selector position information;
with a computer processor, performing at least one of digital object categorization and digital object retrieval, and
providing for outputting results of the at least one of digital object categorization and digital object retrieval, based on the selector position information.

2. The method of claim 1, wherein the selector is presented in a graphical user interface.

3. The method of claim 2, wherein the selector is displayed on a screen and is adjustable with a cursor control device.

4. The method of claim 1, wherein the single selector is adjustable in the range between minimum and maximum values which, for each category in the set of at least ten categories, correspond to upper and lower threshold scores within a range of possible scores output by the categorizer.

5. The method of claim 4, further comprising:
for each of the set of categories, identifying the upper and lower threshold scores based on a computation of at least one of a recall rate, a precision rate, and a false positive rate for each of a set of possible scores output by the categorizer.

6. The method of claim 5, wherein a first of the upper and lower threshold scores is identified, for each category in the set of categories, based on a predetermined false positive rate which is the same for all categories in the set of categories.

7. The method of claim 4, wherein the lower threshold score is greater than a minimum of the possible scores output by the categorizer and the higher threshold score is less than a maximum of the possible scores output by the categorizer.

8. The method of claim 6, wherein a second of the upper and lower threshold scores is based on at least one of a difference in precision rate and a difference in recall rate between the first and second thresholds, which difference is the same for all categories in the set of categories.

9. The method of claim 1, wherein the digital object comprises an image.

10. A method for digital object categorization, comprising:
providing for graphically presenting a selector to a user, the selector including a position which is variably adjustable within a range by the user to adjust a level of noise in digital object categorization, the selector position variably adjusting a number of labels displayed or applied to a submitted digital object, each label corresponding to a respective one of a set of digital object categories, the range of the selector having been normalized over the set of digital object categories based on scores output by a trained categorizer for each of a set of labeled test objects for each of the set of digital object categories and a label for each of the test objects;
receiving selector position information;
with a computer processor, performing digital object categorization, and
providing for outputting results of the digital object categorization, based on the selector position information.

11. The method of claim 10, wherein the outputting of the results includes displaying the labels applied the submitted digital object.

12. The method of claim 11, wherein the number of the displayed labels varies as the selector position is adjusted by a user.

13. The method of claim 11, wherein at least one of the displayed labels fades as the selector position is adjusted by a user.

14. The method of claim 1, wherein the method includes performing digital object categorization, the method further comprising computing a confidence level for a label applied to the submitted digital object including projecting a score for the digital object onto a plot of precision rate vs. category score output by the trained categorizer.

15. The method of claim 1, wherein when the method includes performing digital object retrieval, the selector position variably adjusts a number of digital objects retrieved or displayed in response to a submitted category-based query.

16. The method of claim 15, wherein the outputting of results comprises displaying the retrieved digital objects.

17. The method of claim 16, wherein the number of the displayed digital objects varies as the selector position is adjusted by a user.

18. The method of claim 1, further comprising computing a performance for each category based on the scores output by a trained categorizer for each of the set of labeled test objects and their labels.

19. The method of claim 18, wherein when the method includes digital object categorization, the labels are ranked by category performance.

20. A computer program product comprising a non-transitory recording medium encoding instructions which, when executed by a computer, perform the method of claim 1.

21. A system comprising memory which stores instructions for performing the method of claim 1 and at least one processor, in communication with the memory, for executing the instructions.

22. A system for variably adjusting a level of noise for digital object categorization or retrieval comprising:
   memory storing instructions for presenting a selector with a position which is variably adjustable by a user to adjust a level of noise in at least one of digital object categorization and digital object retrieval, an impact of the single selector on an output of the digital object categorization or digital object retrieval being normalized over a set of at least ten digital object categories based on scores output by a trained categorizer for each of a set of labeled test objects for each of the set of digital object categories and a label for each of the test objects; and
   a computer processor which executes the instructions.

23. The system of claim 22, further comprising the digital object categorizer stored in memory which labels an input digital object, based on the selector position.

24. A method for assisting a user in variably adjusting a level of noise for digital object categorization or retrieval comprising:
   submitting a set of labeled test images to a probabilistic categorizer comprising a categorizer model for each of a set of at least ten digital object categories to generate scores for each of the labeled test images for each of the categories in the set;
   separately, for each of the set of categories, computing upper and lower threshold scores based on the generated scores for that category and labels of the test images; and
   presenting a selector in a graphical user interface with a position which is variably adjustable between noise and silence thresholds by a user to adjust the level of noise in at least one of digital object categorization and digital object retrieval, selectable values of the single selector having been normalized over the set of digital object categories across a range between the upper and lower computed threshold scores for each of the digital object categories.

25. The system of claim 22, wherein when the system is used for performing digital object categorization, the selector position variably adjusts a number of labels displayed or applied to a submitted digital object, each label corresponding to a respective one of the set of digital object categories.

* * * * *